[19] United States Patent
Brady et al.

[11] Patent Number: 6,031,047
[45] Date of Patent: Feb. 29, 2000

[54] IMPACT-MODIFIED POLY(VINYL CHLORIDE) EXHIBITING IMPROVED LOW-TEMPERATURE FUSION

[75] Inventors: Jean Marie Brady, Maple Glen; Steven Richard Rapacki, Pipersville, both of Pa.

[73] Assignee: Rohm and Haas Company, Philadelphia, Pa.

[21] Appl. No.: 09/000,515

[22] Filed: Dec. 30, 1997

Related U.S. Application Data

[60] Provisional application No. 60/034,527, Dec. 30, 1996.

[51] Int. Cl.⁷ .............................. C08L 51/04; C08L 27/06
[52] U.S. Cl. ................................. 525/64; 525/80; 525/84; 525/902
[58] Field of Search .................... 525/64, 84, 80, 525/902

[56] References Cited

U.S. PATENT DOCUMENTS

| | | | |
|---|---|---|---|
| 3,251,904 | 5/1966 | Souder et al. | 525/76 |
| 3,426,101 | 2/1969 | Ryan et al. | 525/93 |
| 3,655,825 | 4/1972 | Souder et al. | 525/82 |
| 3,809,667 | 5/1974 | Coaker et al. | 524/311 |
| 3,859,384 | 1/1975 | Carty et al. | 525/85 |
| 3,859,389 | 1/1975 | Carty et al. | 525/85 |
| 4,086,296 | 4/1978 | Carty et al. | 525/309 |
| 4,542,185 | 9/1985 | Meunier | 525/67 |
| 4,564,653 | 1/1986 | Kamata et al. | 525/67 |
| 4,567,234 | 1/1986 | Meunier | 525/73 |
| 4,690,977 | 9/1987 | Hosoi et al. | 525/83 |
| 4,696,973 | 9/1987 | Kamata et al. | 525/71 |
| 5,194,498 | 3/1993 | Stevenson et al. | 525/81 |
| 5,276,092 | 1/1994 | Kempner et al. | 525/84 |
| 5,612,413 | 3/1997 | Rozkuszka et al. | 525/85 |

FOREIGN PATENT DOCUMENTS

| | | |
|---|---|---|
| 0 184 851 | 6/1986 | European Pat. Off. . |
| 0 217 397 | 4/1987 | European Pat. Off. . |
| 2101814 | 3/1972 | France . |

*Primary Examiner*—James J. Seidleck
*Assistant Examiner*—Olga Asinovsky
*Attorney, Agent, or Firm*—Roger Graham; Darry L Frickey; John Lemanowicz

[57] ABSTRACT

Poly(vinyl chloride), when impact modified with a core/shell acrylic impact modifier whose shell is predominantly formed from 50–90 parts of polymerized units of methyl methacrylate and 10–50 parts of polymeric units of a $C_2$–$C_8$ alkyl acrylate and whose core is a crosslinked copolymer mainly of polymeric units of butyl acrylate, exhibits improved fusion behavior, allowing conversion to an intimate, fused, processable blend at lower temperatures and faster rates, than when the shell of the impact modifier is substantially formed from methyl methacrylate alone.

10 Claims, 6 Drawing Sheets

IMPACT-MODIFIED POLY(VINYL CHLORIDE) EXHIBITING IMPROVED LOW-TEMPERATURE FUSION

This is a nonprovisional application of prior pending provisional application Ser. No. 60/034,527 filed Dec. 30, 1996.

The present invention relates to a toughened weatherable blend of poly(vinyl chloride) (PVC) with a specific acrylic copolymer rubber-based core/shell impact modifier, which blends exhibits improved low-temperature fusion performance during the conversion of the admixed starting components into the blend.

Impact-modified poly(vinyl chloride) for uses such as pipe, gutters, siding, window profiles and the like, has quite acceptable impact- and appearance-retention performance in outdoor applications where it is exposed to natural elements such as sunlight, rain, hail, sleet, or water sprays. Impact modifiers for weatherable PVC have been commercially available for over 20 years, and are commonly based on core/shell (often referred to as multi-stage) (meth)acrylic polymers with a rubbery core based on a rubbery poly(alkyl acrylate), usually poly(n-butyl acrylate).

A problem with such modifiers when blended with PVC has been that the fusion characteristics on compounding the physical blend of powders or other starting materials into a fused, intimate and cohesive melt blend have required long times and high temperatures, which decreases the output rate of the blended material, i.e., increases the overall thermal history of the blend and so offers more opportunity for thermal degradation of the PVC. Although this can be compensated for somewhat by the presence of processing aids and lubricants, or addition of additional costly thermal stabilizers, it is still desirable to cause the physical blend to "flux" faster or fuse at lower temperatures and with lower energy requirements, without compromising the properties of the resultant blend. Solution of this problem for toughened blends, i.e., those containing impact modifiers, can enable cohesive pellets, cubes, moldings, extrusions, and the like to be prepared with less thermal exposure than normally possible with conventional impact modifiers.

Tessyie et al., European Unexamined Patent 217,397 have taught that control over the conversion of PVC from the discrete to the continuous phase in a PVC/acrylic polymer blend can be accomplished at low temperatures by working with softer acrylate compositions, but his additive compositions are soft and difficult to work with in powder form, designed for ease of admixing with the PVC pellets, powder, or beads. Moreover, such additives usually substantially decrease the melt viscosity of the resulting fused blend, changing the processing behavior.

Meunier., U.S. Pat. Nos. 4,542,185 and 4,567,234 has taught a softer copolymer (relative to methyl methacrylate homopolymer) outer shell for a core/shell impact modifier based on a butyl acrylate/butadiene copolymer core, but have not taught or disclosed that improved low temperature fusion resulted when the blends were prepared. Earlier patents, such as by Ryan, U.S. Pat. No. 3,678,133 have taught similar softer copolymer (relative to methyl methacrylate homopolymer) outer shell for a core/shell impact modifier based on a butyl acrylate polymeric core, but also have not taught or disclosed that improved low temperature fusion resulted when the blends were prepared.

I have now unexpectedly found that a narrow compositional range for the shell of core/shell impact modifiers based on cores of homopolymers of butyl acrylate or copolymers of butyl acrylate with higher alkyl acrylates (as defined herein), preferably also containing a multi-functional monomer, when followed by a final shell polymerization of a copolymer of methyl methacrylate with appreciable quantities of a lower alkyl acrylate, yield a readily isolated powdery modifier which unexpectedly imparts improved low-temperature fusion to weatherable formulations of PVC. More specifically, I have discovered a process for the fusion into an intimate blend of a composition comprising (a) 100 parts of a polymer of vinyl chloride;
(b) from 0.5 to 10 parts of at least one stabilizer against thermal decomposition of the homopolymer of vinyl chloride:
(c) from 1 to 25 parts of a core/shell polymer comprising:
  (i) from 60 to 90 parts, based on 100 parts of the core/shell polymer, of a core of a copolymer of butyl acrylate of the composition, based on 100 parts of the core, of
    a) 60 to 99.9 parts of polymerized units of n-butyl acrylate;
    b) from 0 to 39.9 parts of polymerized units of an alkyl acrylate other than n-butyl acrylate, the alkyl group containing 2 to 8 carbon atoms;
    c) from 0.1 to 2.5 parts of polymerized units of at least one non-conjugated polyunsaturated monomer;
  (ii) correspondingly, from 10 to 40 parts, based on 100 parts of the core/shell polymer, of a shell of copolymer of the composition, based on 100 parts of the shell, of
    a) from 50 to 90 parts of polymerized units of methyl methacrylate;
    b) from 10 to 50 parts of polymerized units of at least one alkyl acrylate, the alkyl group containing 2 to 8 carbon atoms;

wherein the fusion is characterized by
1) a pre-fusion torque value at least 15% higher than that for a control composition equivalent in all respects except that the composition of the shell is at least 95 parts of polymerized units of methyl methacrylate, based on 100 parts of the shell;
2) a time to fusion torque no longer, and preferably shorter, than for the control composition;
3) maintenance of color at least equivalent to that of the control composition, the process comprising
1) combining the polymer of vinyl chloride, the stabilizer, and the core/shell polymer into a non-compacted blend;
2) heating and admixing with shear the non-compacted blend to convert it to a fused, intimate, cohesive but non-homogenous melt;
3) melt-processing and then cooling the melt to form a useful object in the form of an extruded object, an injection-molded object, a calendered sheet or film, a compression-molded object, an extruded chopped strand, or re-processable pellets.

In the specification and claims, we use the following definitions, which are believed to be consistent with their use in the current state of the art of processing and impact-modifying PVC. Definitions:

(a) non-compacted blend: a blend of the ingredients mixed under conditions where no fusion occurs of practical consequence, as evidenced by the friable and non-cohesive nature of the resulting blend.

(b) fused, intimate, and cohesive melt: the melt behaves as a rheological liquid, the particles of the various components are dispersed in the melt, and the melt on cooling appears as a continuous non-friable blend.

(c) non-homogenous melt: the melt on cooling will still show crystallinity remaining in the poly(vinyl chloride), and the residual structure of the as-polymerized poly(vinyl chloride) can still be detected to some degree. Typically, PVC is processed so as not to be converted to a homogenous molten blend (a blend which is uniform on a molecular scale, and which shows no residual structure from the as-synthesized PVC). Such a process of homogenization requires so much heat and shear that the poly(vinyl chloride) will have degraded appreciably.

(d) control composition: throughout the specification and claims of this application, the term "control composition" refers to either the pre-fused admixture or the fused blend of a composition containing PVC, a stabilizer, and a core/shell impact modifier, where the type and amount of PVC and stabilizer are the same as in the novel compositions or processes claimed or described in the present invention. Further the amount of core/shell modifier, the amount of the core in the core/shell modifier, and the composition of the core in the core/shell modifier are the same as in the novel compositions or processes. The only variant in the total control composition from the inventive compositions is the ratio or amount of polymeric units comprising the shell of the core/shell modifier, which "control" shell is at least 95 parts of polymerized units of methyl methacrylate, based on 100 parts of the shell.

In a separate aspect of the invention, the core/shell impact modifier with the copolymerized alkyl acrylate in the shell may be replaced by a core/shell polymer comprising:

(i) from 60 to 90 parts, based on 100 parts of the core/shell polymer, of a core of a copolymer of butyl acrylate of the composition, based on 100 parts of the core, of
 a) 60 to 99.9 parts of polymerized units of n-butyl acrylate;
 b) from 0 to 39.9 parts of polymerized units of an alkyl acrylate other than n-butyl acrylate, the alkyl group containing 2 to 8 carbon atoms;
 c) from 0.1 to 2.5 parts of polymerized units of at least one non-conjugated polyunsaturated monomer;
(ii) correspondingly, from 10 to 40 parts, based on 100 parts of the core/shell polymer, of a shell of copolymer of the composition, based on 100 parts of the shell, of
 a) from 50 to 85 parts of polymerized units of methyl methacrylate;
 b) from 20 to 50 parts of polymerized units of at least one alkyl methacrylate, the alkyl group containing 4 to 12 carbon atoms, such as n-butyl.

The invention further encompasses the process and compositions where the shell contains both copolymerized polymeric units of alkyl acrylate and alkyl methacrylate, within the boundary conditions taught above.

It is preferred that the at least one non-conjugated polyunsaturated monomer is selected from the group consisting of allyl methacrylate, allyl acrylate, diallyl fumarate, diallyl maleate, diallyl itaconate, and glycol or polyol esters of acrylic or methacrylic acid. It is separately preferred that the at least one stabilizer is from 1 to 4 parts of an organotin ester or a calcium salt of a long chain organic acid. It is further and separately preferred that the core polymer contain 97.5 to 99.9 weight percent of polymerized units of butyl acrylate, and that the alkyl group of the polymerized unit of alkyl acrylate or alkyl methacrylate in the shell composition be n-butyl. Especially preferred is n-butyl acrylate.

I have further discovered a melt-blended composition comprising:
 (a) 100 parts of a polymer of vinyl chloride;
 (b) from 0.5 to 10 parts of at least one stabilizer against thermal decomposition of the homopolymer of vinyl chloride:
 (c) from 1 to 25 parts of a core/shell polymer comprising:
  (i) from 60 to 90 parts, based on 100 parts of the core/shell polymer, of a core of a copolymer of butyl acrylate of the composition, based on 100 parts of the core, of
   a) 60 to 99.9 parts of polymerized units of n-butyl acrylate;
   b) from 0 to 39.9 parts of polymerized units of an alkyl acrylate other than n-butyl acrylate, the alkyl group containing 2 to 8 carbon atoms;
   c) from 0.1 to 2.5 parts of polymerized units of at least one non-conjugated polyunsaturated monomer;
  (ii) correspondingly, from 10 to 40 parts, based on 100 parts of the core/shell polymer, of a shell of copolymer of the composition, based on 100 parts of the shell, of
   a) from 50 to 90 parts of polymerized units of methyl methacrylate;
   b) from 10 to 50 parts of polymerized units of an alkyl acrylate, the alkyl group containing 2 to 8 carbon atoms;
wherein the composition is characterized during melt-blending by
 1) a pre-fusion torque value at least 15% higher than that for a control composition equivalent in all respects except that the composition of the shell is at least 95 parts of polymerized units of methyl methacrylate, based on 100 parts of the shell;
 2) a time to fusion torque no longer than for the control composition;
 3) maintenance of color at least equivalent to that of the control composition.

I further have discovered a melt-blended composition comprising
 (a) 100 parts of a polymer of vinyl chloride;
 (b) from 0.5 to 10 parts of at least one stabilizer against thermal decomposition of the homopolymer of vinyl chloride:
 (c) from 1 to 25 parts of a core/shell polymer comprising:
  (i) from 60 to 90 parts, based on 100 parts of the core/shell polymer, of a core of a copolymer of butyl acrylate of the composition, based on 100 parts of the core, of
   a) 60 to 99.9 parts of polymerized units of n-butyl acrylate;
   b) from 0 to 39.9 parts of polymerized units of an alkyl acrylate other than n-butyl acrylate, the alkyl group containing 2 to 8 carbon atoms;
   c) from 0.1 to 2.5 parts of polymerized units of at least one non-conjugated polyunsaturated monomer;
  (ii) correspondingly, from 10 to 40 parts, based on 100 parts of the core/shell polymer, of a shell of copolymer of the composition, based on 100 parts of the shell, of
   a) from 50 to 85 parts of polymerized units of methyl methacrylate;
   b) from 20 to 50 parts of polymerized units of at least one alkyl methacrylate, the alkyl group containing 4 to 12 carbon atoms; wherein the composition is characterized during melt-blending by
   1) a pre-fusion torque value at least 15% higher than that for a control composition, equivalent in all respects except that the composition of the shell is at least 95 parts of polymerized units of methyl methacrylate, based on 100 parts of the shell;
   2) a time to fusion torque no longer than for the control composition;
   3) maintenance of color at least equivalent to that of the control composition.

I further have discovered that the shell of the core/shell copolymer used in the melt-blended composition can also be:

a) from 40 to 90 parts of polymerized units of methyl methacrylate; and b) from 10 to 60 parts of polymerized units of an alkyl acrylate, the alkyl group containing 2 to 8 carbon atoms.

It is further noted that the time to fusion torque occurring and also the time from compaction to pre-fusion torque minimum value is lessened for the presence of the core/shell polymers of the present invention relative to their analogues with a methyl methacrylate homopolymer hard shell. This time differential is more difficult to quantify, but it directly relates to fusion occurring at lower temperatures, since less heat/time is required in both instances.

Although the discovery as defined by a comparative constant temperature test method does not directly relate to an enhanced ability to achieve acceptable fusion at lower processing temperatures, there has been independently shown a direct correlation between the parameters defined here and the ability to so process at lower temperatures in operations such as compounding for pellets, extrusion of blends into useful objects, and the like.

The invention is defined in terms of performance in a well-known test for fusion of poly(vinyl chloride) which simulates the performance in large-scale processing equipment. The components of the blend, namely, PVC, the impact modifier, and appropriate stabilizers, lubricants, etc. are first dry-blended without additional external heating (some frictional heating to ca. 100 to 110 C. will occur). The powdered blend is then placed in a heated bowl, such as that of a Haake mixer, with stirring. The mass first compacts, and the torque on the mixing blade is registered at time=0. There is then a drop in torque to a minimum value, defined as pre-fusion torque value; in a typical run (see FIG. 1), the time to this valley is about 20 seconds, but it will of course vary with the chosen mixing device, sample size, formulation and temperature conditions. The torque then rises to a shallow peak, and then slowly declines. The point at which the declination begins is chosen as the time to fusion torque, although the fusion torque is not strictly constant. Eventually, the torque will level to a plateau equilibrium value(usually measured after ca. 10 minutes of mixing), and finally the stabilization effect will be overcome and the PVC will begin to decompose and cross-link (with a rise in torque), but with appropriate stabilization present, this aspect of the fusion behavior is irrelevant to the present invention.

BRIEF DESCRIPTION OF THE DRAWINGS

As seen in FIG. 1, the values for pre-fusion torque and time to fusion torque can be determined, and contrasted with appropriate controls. In FIG. 1, the curves are given for a masterbatch of PVC and other additives, but no impact modifier, for an impact modifier whose shell is poly(methyl methacrylate) and for an impact modifier of the same particle size and core/shell ratio, but whose shell is 82/18 methyl methacrylate/ butyl acrylate copolymer. It can be seen that the pre-fusion torque is higher for the control impact modifier than the unmodified masterbatch, but significantly higher for the modifier with the copolymer shell. Further, the time to fusion torque is not lengthened, but is actually shorter for the modifier with the copolymer shell.

Figure 1:
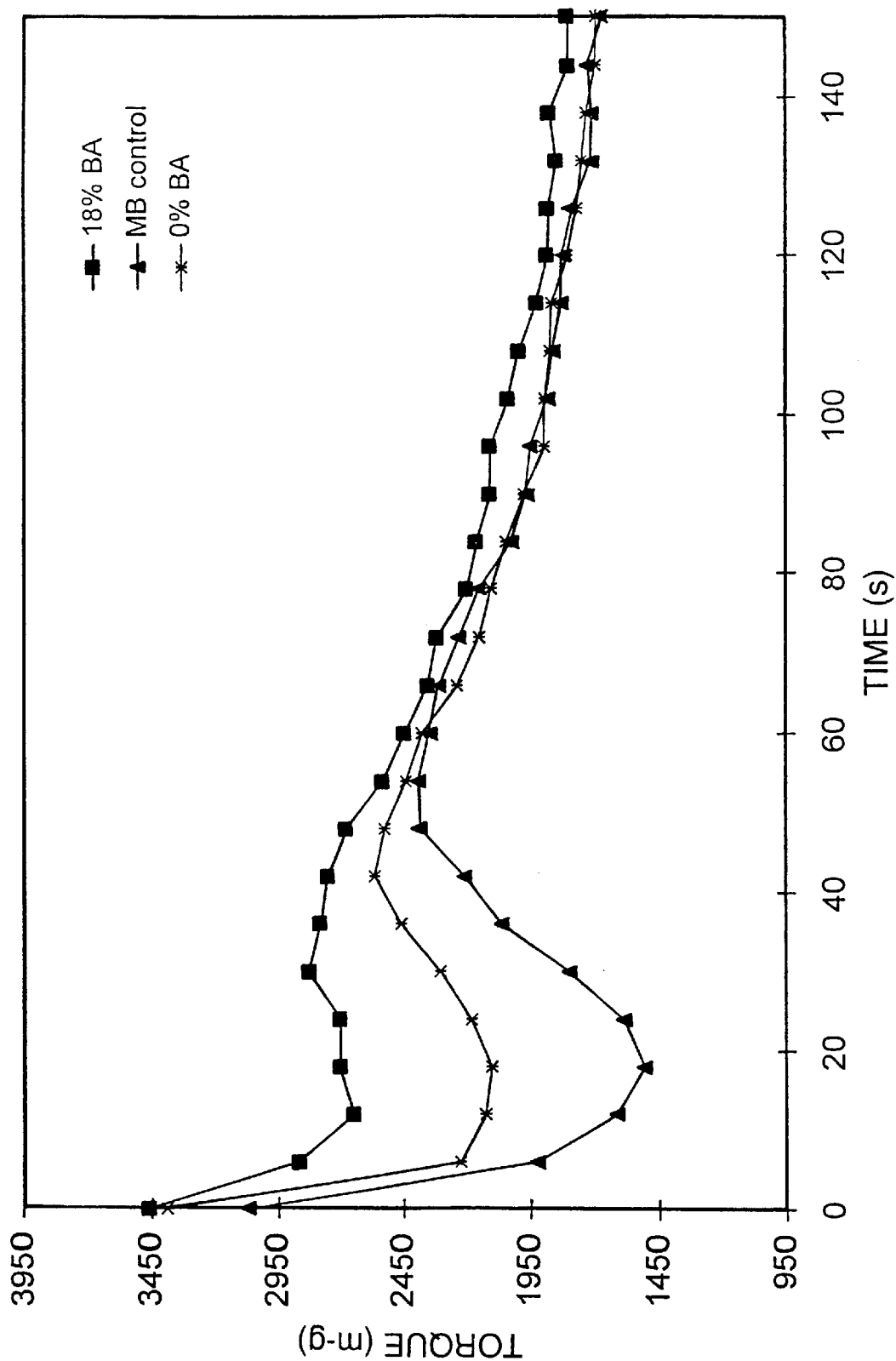
FIG. 1 is illustrative of the response curves developed with the commercial masterbatch MB-2 at 187° C., with no impact modifier, with the core/shell modifier with a poly(methyl methacrylate) homopolymer outer shell (Example IM-1A), and with a similar impact modifier except with 18% of the polymerized units of the shell being butyl acrylate (Example IM-C).

The polymer of vinyl chloride may be a homopolymer or may be a copolymer which is at least 85 weight % of polymerized units of vinyl chloride, the remaining units being at least one of vinylidene chloride, vinyl acetate, ethylene, or propylene. In separate preferred embodiments to both the process and melt-blended composition inventions, it is preferred that the polymer of vinyl chloride is a homopolymer of vinyl chloride, or that the alkyl acrylate other than butyl acrylate is 2-ethylhexyl acrylate, or that the at least one non-conjugated polyunsaturated monomer be present at from 0.5 to 1.0 weight percent. Another possible embodiment is that the final shell polymer further contains from 0.05 to 1.0 weight percent of units derived from a mercaptan chain transfer agent, such as an alkyl mercaptan, a mercaptoester, and the like.

Preferred examples of the non-conjugated polyunsaturated monomer exhibit the functional groups

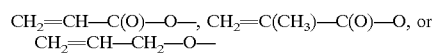

Examples of such monomers are 1,3-butylene glycol diacrylate, 1,4-butylene glycol diacrylate, trimethylolpropane triacrylate, allyl acrylate, allyl methacrylate, and the like. Other polyfunctional monomers may also be employed, such as divinylbenzene, 1,3-butylene glycol dimethacrylate, and the like.

For reasons of aiding isolation by coagulation or spray-drying by having present a shell of high glass temperature as well as conferring compatibility of the outer shell with the PVC matrix, it is preferred that the shell of the multi-shell core/shell impact modifier contain no more than 35 parts of polymeric units derived from an alkyl acrylate wherein the alkyl group contains 2 to 8 carbon atoms. The shell may also contain a non-conjugated polyfunctional monomer, the polyfunctional monomer preferably present at levels of 0.3 to 1.0 weight % of all monomers in the shell polymerization, as defined above. The shell may also contain optionally small amounts of other monomers, such as vinyl aromatic monomers, (meth)acrylonitrile, and the like.

In another preferred embodiment, the particle size of the first or core polymer is less than 400 nm. and the core of the core/shell copolymer comprises 60–88, more preferably 75–85 weight percent of the total core/shell polymer. Such modifiers can be isolated by coagulation or spray-drying from their emulsion preparation to yield free-flowing powders of outstanding impact efficiency.

The isolation of the core/shell polymer from emulsion by coagulation or spray-drying may be aided by co-isolation with a low level of a polymer high in methyl methacrylate content, or by co-isolation with a small amount of a particulate additive such as silica or calcium stearate-coated calcium carbonate.

The additive polymers are also useful as impact modifiers for engineering resins, such as aromatic polyesters, polycarbonate, and the like. For such uses, they may contain thermal stabilizers, such as hindered phenols, organic sulfur compounds, organic phosphites, and the like, which may be added to the core/shell polymer as it is being isolated from emulsion. For use in poly(vinyl chloride), there is little need for addition of stabilizers to the additive polymer, since stabilizers are required in the processed formulation for a variety of reasons.

The core/shell polymers utilized in the present invention are most useful for modification of poly(vinyl chloride) homo- and copolymers. When blended with poly(vinyl chloride) (PVC), the blend will also contain 0.5 to 10 parts of one or more thermal stabilizers for PVC, such as organotin compounds, organolead compounds, barium-cadmium organic salts, calcium-zinc organic salts, and the like. It may also contain lubricants to aid release from hot metal surfaces, such as waxes, olefin polymers, certain acrylic core/shell polymers, and also processing aids for promoting fusion and increasing melt strength, such as high molecular weight copolymers of methyl methacrylate. It may also contain colorants, fillers, and the like. Fillers such as calcium carbonate ($CaCO_3$) may be used in the blend at levels of about 0.1 to 30 parts.

It is suggested in the art that PVC processing aids which contain acrylate esters copolymerized with methyl methacrylate lead to improved fusion and other desirable rheological properties. However, the presence of processing aid, whether combined with the impact modifier on isolation, or present in the overall formulation, can detract from the impact efficiency of the impact modifier by diluting its effect as well as leading to higher die swell in extruded strands, sheets, profiles, etc. Therefore, it is desirable that the component which contributes to fusion at lower temperatures be present only or predominantly as part of the core/shell impact modifier. Further, the studies similar to those reported herein show that the desired effect of fusion behavior is seen when the acrylate monomer is copolymerized in the shell, as contrasted to increasing the amount in the core, or producing a separate layer of acrylate polymer. For example, an impact modifier with 18% polymerized units of butyl acrylate in the shell and with 70% or 60% core polymer is no less efficient in producing improved low temperature fusion (as judged by the tests specified herein) than a similar impact modifier with 80% core; all three are more efficient than a similar modifier with 80% core and a methyl methacrylate homopolymer shell.

The practical processing of PVC is well-known to the art, and may be conducted utilizing a variety of equipment. First, the polymer of vinyl chloride, the stabilizer, and the core/shell polymer are combined into a non-compacted blend, most commonly by admixture without external heating in a blending apparatus. The components may be mixed all at once, or sequentially. Next, the non-compacted blend is subjected to heating and admixing with shear to convert it to a fused, intimate, cohesive but non-homogenous melt. This mixing may be done on a heated mill roll with shear mixing at the nip, in the barrel of an extruder, in a Banbury mixer, or similar devices where the heat and shear conditions may be varied, and where there exists a means for discharged of the fused blend.

Finally, the fused blend may be discharged as a strand or milled sheet to be pelletized for later processing, such as injection molding, or to be compression molded. Alternatively, the fused blend may be processed through appropriate dies, sizing equipment, take-up rolls, and the like, directly to a film, calendered sheet, extruded profile, such as window frames, or an injection-molded object.

The blends are useful in opaque applications where toughness, especially at low temperature, and weatherability is desired. The uses include, but are not limited to, vinyl siding for houses, vinyl profiles for building products, and vinyl foam for building decoration, pipe, and the like. ("Vinyl" is a commercial abbreviation for fabricated products based on poly(vinyl chloride).) Production of useful objects is accomplished by techniques well-known to the vinyl industry. The blends may be made directly from powder blends, or may be first compounded into pellets or cubes for molding or extrusion. Conventional extrusion equipment for the production of vinyl siding or profile may be utilized. If a foaming agent is also employed, good quality foam may be formed from appropriate foam extrusion apparatus for vinyl.

The blends of the present invention, when used with lower-molecular weight poly(vinyl chloride), such as that with a Fikentscher K value of 51, are also useful as starting materials for the preparation of injection-molded articles, as the blends will exhibit good weatherability and enhanced thermal aging properties.

A further advantage of the impact modifiers taught herein is that they disperse well into the PVC matrix. When compared at equivalent processing conditions with the control modifier component, which contains a shell which is mainly polymerized units of methyl methacrylate, the modifiers with the modified shell component produce a milled sheet or molded or extruded article with a lower content of gel, which leads to a better appearance and cleaner surface for the resulting article. The advantage is that the mixing conditions may be less severe to accomplish satisfactory dispersion, thus reducing heat and mechanical stress on the blend during processing. There is not a direct correlation between good dispersion and higher pre-fusion torque or the ability to achieve good fusion at lower temperatures, as certain commercial acrylic-based impact modifiers with a shell which is essentially poly(methyl methacrylate) will exhibit good dispersion after processing, yet do not exhibit the higher pre-fusion torque or good fusion at lower processing temperatures seen for the formulations discovered herein.

Certain synthesis variations for the shell structure of the present impact modifiers have resulted in adverse effects on fusion performance. Addition of methacrylic acid to the shell, crosslinking the shell, such as with a polyfunctional unsaturated monomer, an additional "chase" of methyl methacrylate after formation of the core/shell polymer, adding the methyl methacrylate and alkyl acrylate in separate "shots", or adding styrene to the shell all produce equivalent or lower pre-fusion torque values when compared to the control with poly(methyl methacrylate) as the shell component.

The following are examples of the preparation and use of the modifiers in the PVC blends and processes of the present invention.

EXAMPLES

FIG. 1 is illustrative of the response curves developed with the commercial masterbatch MB-2 at 187° C., with no impact modifier, with the core/shell modifier with a poly (methyl methacrylate) homopolymer outer shell (Example IM-1A), and with a similar impact modifier except with 18% of the polymerized units of the shell being butyl acrylate (Example IM-C). These three curves clearly show the increase in pre-fusion torque as impact modifier is added, and the further increase as butyl acrylate replaces methyl methacrylate in the shell. They further show that both the time to pre-fusion minimum torque and to the peak time signaling the attainment of the fusion torque region are decreased with the addition of the co-monomer to the shell polymer.

Figure 2:
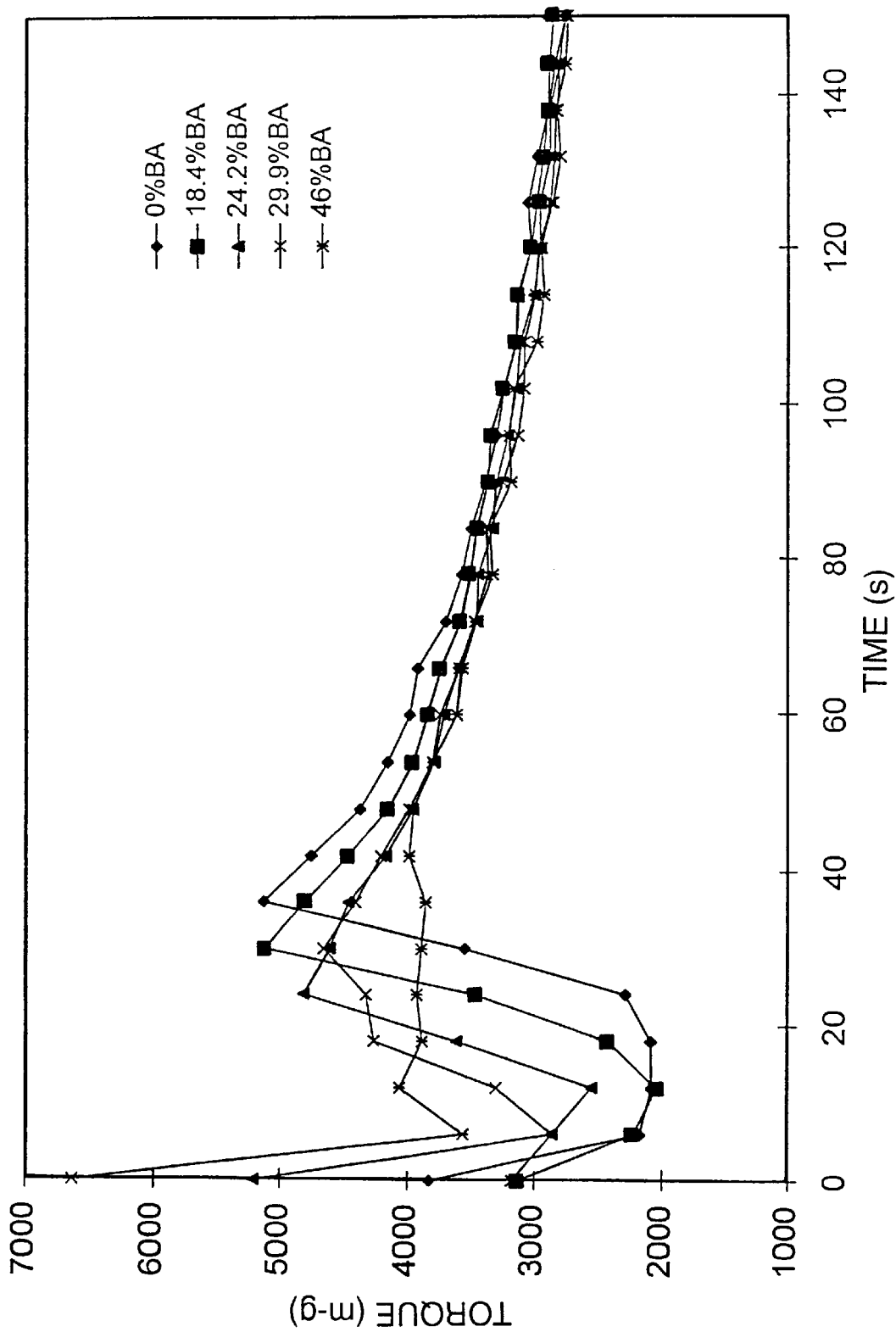
FIG. 2 illustrates various levels of butyl acrylate in the shell of the core/shell impact modifier, from 0 to 46% (modifiers ID-1B, -1C, -1D and -1E).
Figure 3:
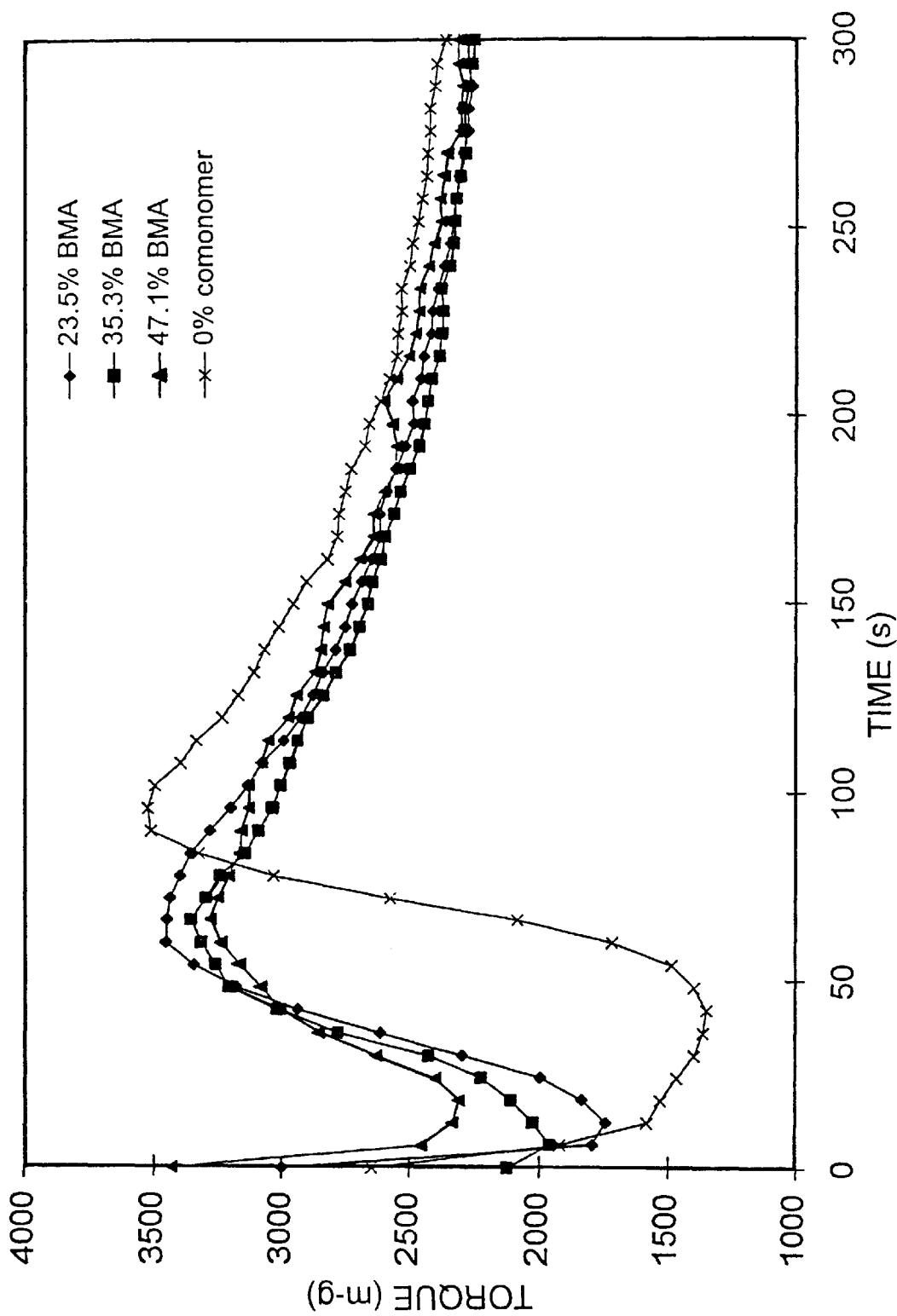
FIG. 3 illustrates similar results where the co-monomer is butyl methacrylate (modifiers ID2A, -2B, and -2C), at levels from 0 to 47.1%.
Figure 4:
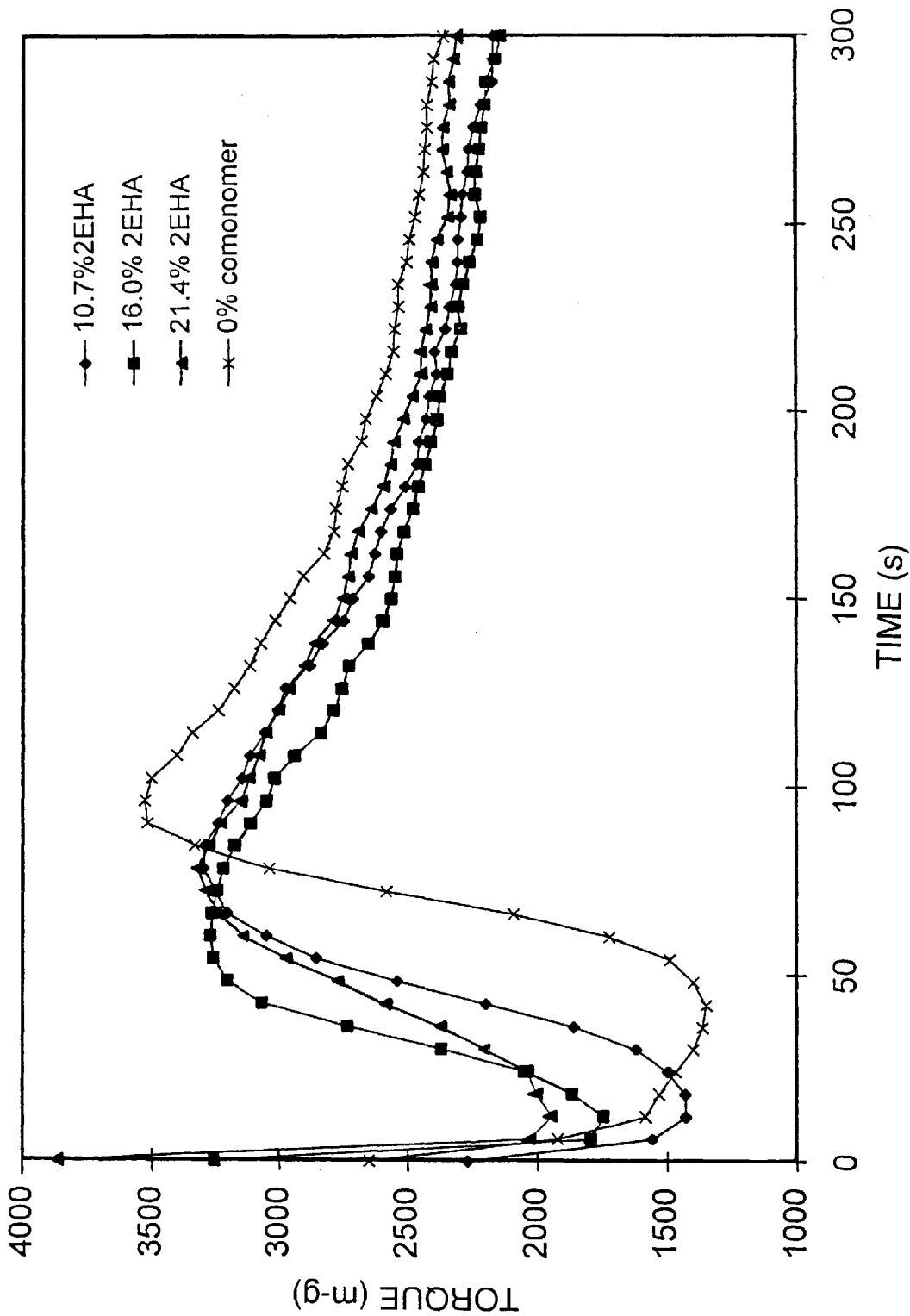
FIG. 4 illustrates the use of 2-ethylhexyl acrylate in the shell composition, at levels from 0 to 2.14% (modifiers ID-3A, -3B, and -3C).
Figure 5:
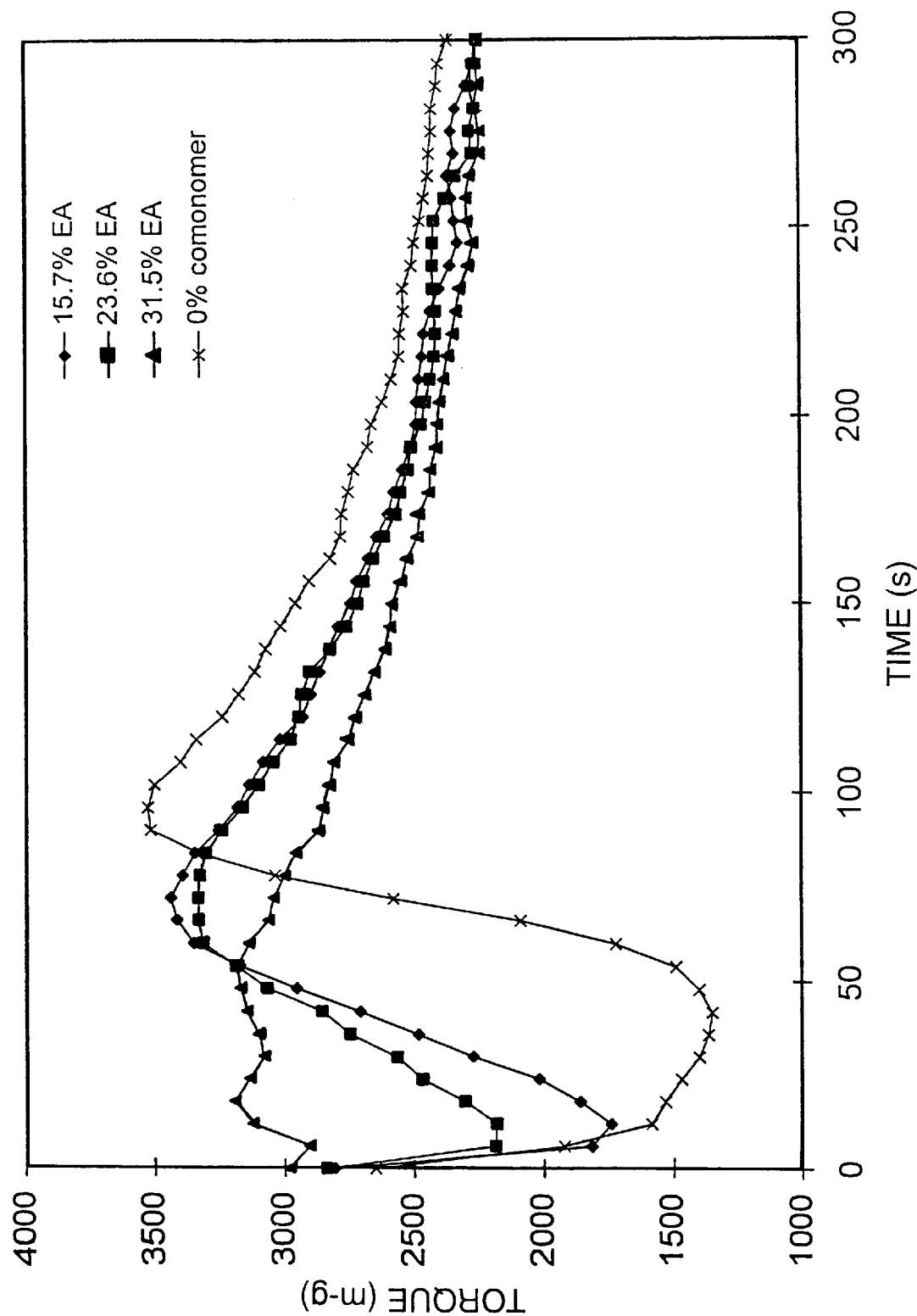
FIG. 5 illustrates torque vs. time curves for varying amounts of ethyl acrylate in the shell composition.
Figure 6:
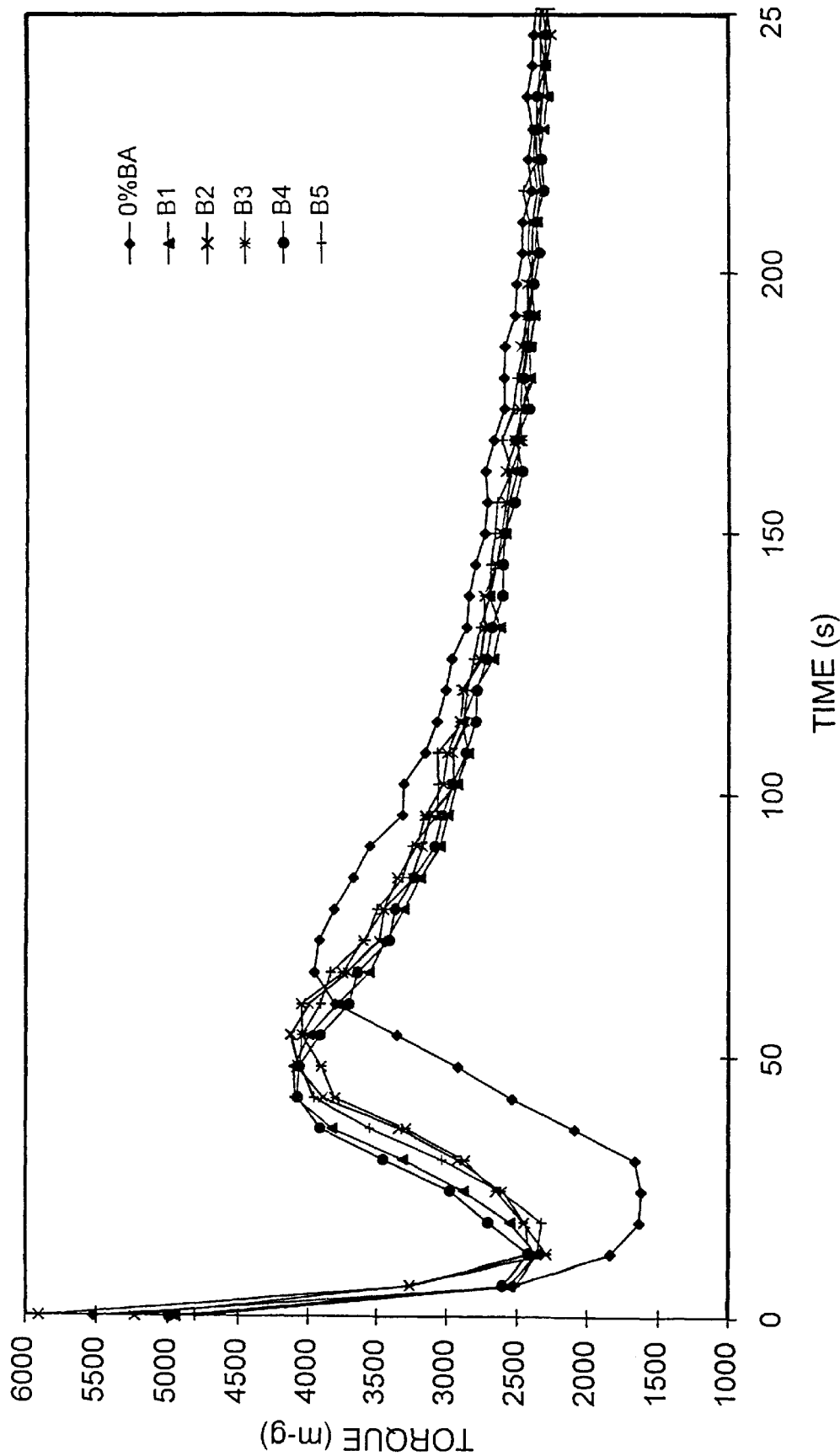
FIG. 6 illustrates the consistency in improvement among five samples of the sample impact modifier (ID-1A) with 18% butyl acrylate copolymerized in the shell, but the isolated by spray-drying under various conditions so as to vary the particle size of the resulting powder.

FIG. 2 illustrates various levels of butyl acrylate in the shell of the core/shell impact modifier, from 0 to 46% (modifiers ID-1B, -1C, -1D and -1E). (In this comparison, for some unknown reason the sample (ID-1B) with 18.4% BA does not behave in regards to increased pre-fusion torque as is seen for samples of identical composition in FIG. 1 or FIG. 5; the cause of this single aberration is unknown). FIG. 3 illustrates similar results where the co-monomer is butyl methacrylate (modifiers ID-2A, -2B, and -2C), at levels from 0 to 47.1%. FIG. 4 illustrates the use of 2-ethylhexyl acrylate in the shell composition, at levels from 0 to 21.4% (modifiers ID-3A, -3B, and -3C). FIG. 6 illustrates the consistency in improvement among five samples of the sample impact modifier (ID-1A) with 18% butyl acrylate copolymerized in the shell, but isolated by spray-drying under various conditions so as to vary the particle size of the resulting powder. All samples studied in FIGS. 2 to 5 were prepared with masterbatch MB-1.

Preparative Examples 1–3 and Control

These examples demonstrate the unexpected advantages of softer shell copolymer composition of the core/shell modifier of particle size ca. 250 nm. and 20 weight-percent shell content, as contrasted to a similar composition with a poly(methyl methacrylate) homopolymer shell.

This preparation is Example 1-A in the following Tables. A multi-stage polymer is prepared in emulsion by the following recipe. (BA is butyl acrylate, MMA is methyl methacrylate, TMPTA is trimethylolpropane triacrylate, and BDA is 1,3-butylene glycol diacrylate). To an appropriate stirred reactor fitted with means for nitrogen sweep, a reflux condenser, and means for adding monomers and initiators, is charged 720 grams of deionized water. 258.45 grams of a 45% solids emulsion of a 103 nm. p.s. latex of BA/MMA/methacrylic acid=52/46.7/1.3, 0.38 ml. of glacial acetic acid, and 35 g. of rinse water. The mix is heated to 45° C. while sparging with nitrogen for one hour. The nitrogen is now adjusted to sweep the atmosphere over the reaction mixture and 1.75 grams of sodium formaldehyde sulfoxylate (SSF) (0.1% BOM (based on monomer)) in 63 grams of water is added and stirred for 3 minutes. A gradual addition of an initiator feed over a 15-minute period is begun; the feed is 0.23 ml. of cumene hydroperoxide (CHP) emulsified in 54 grams of water with 1.1 grams of a 28% solution of sodium lauryl sulfate. Simultaneously or almost simultaneously there is added over 15 minutes 210 grams of an emulsified monomer mix (EMM) comprising 25.78 grams of a 28% sodium lauryl sulfate solution, 460 grams of water, 1413.49 grams of butyl acrylate (BA), 15.7 grams of TMPTA, and 35 grams of a water rinse.

After a three minute hold, the reaction, now at ca. 52° C., is treated with 0.41 grams CHP and 377 grams of the EMM over a 12 minute period, then 0.81 grams CHP and 754 grams of the EMM over a 11 minute period, then 0.59 grams CHP and 548 grams of the EMM over a 4 minute period, then 0.42 grams allyl methacrylate. At this point, the reaction temperature is ca. 92° C. The reaction mixture is held for 90 minutes; the conversion, based on expected solids, is 97.8%. The reaction mixture is cooled. The conversion is 99.3%, based on final solids, and the particle size 241 nm.

This cross-linked rubbery latex "core" or first-stage (970 g.) is charged to a similar reactor and heated to 52° C. while sparging lightly with nitrogen for 45 minutes. The nitrogen is adjusted to a sweep, and a monomer mix of 4.0 grams of 28% sodium lauryl sulfate solution, 311 grams of methyl methacrylate, 68 grams of butyl acrylate, and 1.8 ml. (0.004% BOM) n-dodecyl mercaptan is added all at once and stirred for 5 minutes. Then is added SSF (0.09 grams) in 30 ml. water with a 10 ml., rinse, stirring is continued for 34 minutes, and then sodium persulfate (NAPS) (0.28 grams) in 30 ml. water with a 10 ml. rinse is added. After 25 minutes, the temperature has peaked, and the mixture temperature is adjusted to 60° C. Additional SLS is added (7.45 grams of a 28% solution) for emulsion stabilization. The polymeric emulsion is then filtered and cooled. The particle size is ca. 250 nm. The polymer is isolated from the emulsion by spray-drying at 150° C. inlet and 75° C. outlet; 2.5 weight percent of calcium stearate-coated calcium carbonate is added to enhance the isolation properties. The sample is designated IM-1A, with 82% polymerized units of methyl methacrylate and 18% of n-butyl acrylate in the shell.

A control is made in a similar manner but with no n-butyl acrylate in the shell, and 378 grams of methyl methacrylate. The sample is designated IM-C Other samples in the IM-1 series are prepared in a similar manner, but with varying amounts of butyl acrylate (or of other (meth)acrylate co-monomers) in the shell. FIG. 2 describe these. Additional series are shown in FIG. 3 for various amount of copolymerized butyl methacrylate, in FIG. 4 for various amounts of copolymerized 2-ethylhexyl acrylate, and in FIG. 5 for various amounts of ethyl acrylate. For these variants, isolation was by coagulation with calcium chloride as the coagulant and with heated coagulant and emulsion.

TABLE 1

Identification of Polymers Represented in Curves: ALL Are 80% Core, and of Similar Particle Size

| Polymer ID | Weight % MMA in Shell | Weight % Butyl Acrylate in Shell | Weight % Butyl Methacrylate in Shell | Weight % 2-Ethylhexyl Acrylate in Shell |
|---|---|---|---|---|
| ID-C (CONTROL) | 100 | | | |
| ID-1A | 82 | 18 | | |
| ID-1B | 82 | 18.4 | | |
| ID-1C | 75.8 | 24.2 | | |
| ID-1D | 70.1 | 29.9 | | |
| ID-1E | 54 | 46 | | |
| ID-2A | 76.5 | | 23.5 | |
| ID-2B | 64.7 | | 35.3 | |
| ID-2C | 52.9 | | 47.1 | |
| ID-3A | 89.3 | | | 10.7 |
| ID-3B | 84 | | | 16 |
| ID-3C | 78.6 | | | 21.4 |

The fusion curves from which the determination of pre-fusion torque, time to fusion torque, and color was made are generated as follows:

In a Haake mixer equipped with a bowl, a stirring paddle, and a device for measuring torque, the bowl being maintained isothermally at 125° C. and stirred at 50 rpm, is placed 60 grams of charge of a formulation (MB-1) which is designed for injection-molding and therefore utilizes a PVC of low molecular weight. (In later experiments, formulation and/or mixing conditions may be changed). The amount of impact modifier may be varied; a typical value is 8.7% based on total formulation (10 parts per 100 parts of PVC resin).

TABLE 2

Components of Masterbatch MB-1

| Component | Parts per 100 parts of PVC | Trade name |
|---|---|---|
| PVC homopolymer, K = 51 | 100 | Geon 110X477 |
| Methyl tin stabilizer | 2.0 | TM-181 |
| Glycerol monostearate external lubricant | 2.7 | Aldo MS |
| Oxidized polyethylene internal lubricant | 0.3 | AC629A |

As the powder blend is stirred and heated, compaction occurs with a sharp rise in torque (compaction peak); this part of the curve is generally not recorded because of the excessive variability. The point of compaction is taken at time t=0, and the torque is then plotted as a function of time. In a typical curve (FIG. 1), the torque decreases prior to fusion, and the torque (designated the pre-fusion torque) is measured at the minimum of the curve. With further mixing, fusion occurs, the torque rises and then levels out at the fusion torque. The time to reach this fusion torque is recorded. Equilibrium torque and degradation values are not plotted.

A second commercial masterbatch (MB-2), designed for profile extrusion, contains the following, but ratios are not known. In general, 6.7 phr of impact modifier is employed.

TABLE 3

Components of Masterbatch MB-2

| Component |
|---|
| PVC homopolymer, K = 65–69 |
| Titanium dioxide |
| Oxidized polyethylene |
| Glycerol monooleate external lubricant |
| Poly(methyl methacrylate) processing aid |
| Chlorinated polyethylene |
| Organotin stabilizer |
| Calcium stearate external lubricant |
| N,N'-1,2-ethanediylbis stearamide |
| Paraffin wax internal lubricant |

Example 2

This example presents evaluation of various bowl parameters and of impact strength for several core/shell modifiers to show equivalence of performance in impact behavior and desired changes in torque behavior. In Table 5 are recorded values of impact strength and fusion behavior (Haake bowl) for two test conditions for 10 parts per hundred (Formulation A) or 5 parts per hundred (Formulation B) of core/shell modifiers of the composition IM-C, IM-1A, and IM-1C. Equilibrium torque is measured at 10 minutes from when powder is charged top the bowl.

Formulation A is the MB-1 masterbatch described above. Formulation B is a window profile master batch (MB-3), described in Table 4.

TABLE 4

Components of Masterbatch MB-3

| Component | Amount |
|---|---|
| PVC homopolymer, K = 66 | 100 |
| Titanium dioxide | 10 |
| Calcium carbonate | 3 |
| Poly(methyl methacrylate) processing aid (Paraloid K-120-N) | 1.5 |
| Lubricating-processing aid (Paraloid K-175) | 1.0 |
| Organotin stabilizer (TM-181) | 1.5 |
| Calcium stearate external lubricant | 1.2 |
| Paraffin wax internal lubricant | 1 |

In the Izod impact test, a series of notched bars is broken at a test temperature and those exhibiting ductile breaks (with high break values for the individual sample, >1060 joules/meter) are measured as a percentage of the total samples. Samples are compression molded into standard bars with a 10 mil notch and 15 samples impacted at each temperature. All reported samples have a ductile-brittle transition temperature in the range 18–20° C., within the accuracy of the Izod test measure of ±1° C.

TABLE 5

Test Values, Including Impact Performance for Impact Modifiers with Butyl Acrylate in Shell

| Test | Test Condition | IM-C | IM-1A | IM-1C |
|---|---|---|---|---|
| % Butyl Acrylate in Shell | | 0 | 18 | 25 |
| Fusion time, sec | A | 45 | 37 | 33 |
| Pre-fusion torque, m-g. | A | 1960 | 2840 | 2610 |
| Fusion time, sec. | B | 77 | 64 | 59 |
| Pre-fusion torque, m-g. | B | 1250 | 1500 | 1650 |
| Equilibrium torque, m-g | B | 1760 | 1720 | 1700 |
| Izod Impact, % ductile breaks | Test Temp., °C. | | | |
| | 17 | 87 | 60 | 53 |
| | 19 | 100 | 97 | 73 |
| | 21 | 93 | 100 | 100 |
| | 23 | 100 | 100 | 93 |

Example 3

The unexpected results identified in this example is the ability of the core/shell modifier of this invention to overcome the lubricating effect of higher filler loadings and have a positive effect on impact performance. The core/shell modifier greatly increases the probability of increased filler loadings and being able to obtain the required physical properties for vinyl products, such as siding, without increased use of processing aids or lubricant re-balancing that can have deleterious effects on stability and rheology.

Formulation 1 is used to benchmark processing performance of what might be considered a typical PVC siding substrate. For lower cost, Formulation 2 decreases impact modifier loading and increases calcium carbonate filler loading. The effect of increased filler shows a dramatic effect upon the fusion time of the compound, increasing fusion time by a factor of three. This shift contributes to the poorer physical properties of the resultant extrudate as seen in its lower Drop Dart Impact in Evaluation 1. Formulation 3 is an attempt to modify the processing contribution by balancing the formulation to facilitate fusion: internal lubricant (calcium stearate) and processing aid level are increased;

external lubricant (in the case of paraffin wax) is reduced, or, (in the case of the polyethylene wax) replaced with one that tends to promote fusion. The fusion time for this formulation is indeed shorter, but is still longer than the standard, typical compound by a factor of two. The Drop Dart Impact shown in Evaluation 2 shows the relative performance of the standard and Formulation 3 to be the same as for Formulation 2 and the standard.

Formulation 4 substitutes the core/shell modifier of this invention for Paraloid™ KM-334 impact modifier; otherwise, it is identical to Formulation 3. The effect of the core/shell modifier of this invention on fusion is dramatic; it decreases fusion time to the level of the standard compound (in combination with the other compound changes discussed above), and reduces fusion time to about one-half of that same compound that contains the KM-334 impact modifier as its only variant. Its effect on physical impact properties shows an increase of statistical significance over the other two highly filled compounds.

Processing Effect with Increased Filler Loading

|  | 1 | 2 | 3 | 4 |
|---|---|---|---|---|
| FORMULATIONS |  |  |  |  |
| GEON 27 | 100.00 | 100.00 | 100.00 | 100.00 |
| TM-281SP | 0.90 | 0.90 | 0.90 | 0.90 |
| Calcium Stearate | 1.20 | 1.20 | 1.40 | 1.40 |
| XL-165 Paraffin | 0.80 | 0.80 | 0.70 | 0.70 |
| PE (AC-629A) | 0.10 | 0.10 | — | — |
| PE (AC-316) | — | — | 0.15 | 0.15 |
| TiO2 | 1.00 | 1.00 | 1.00 | 1.00 |
| CaCO3 | 10.00 | 20.00 | 20.00 | 20.00 |
| K-120N | 1.00 | 1.00 | 1.25 | 1.25 |
| KM-334 | 5.00 | 4.00 | 4.00 | — |
| Core/Shell modifier | — | — | — | 4.00 |
| BRABENDER RHEOLOGY |  |  |  |  |
| Compact. Time | 18 | 82 | 58 | 18 |
| Compact. Torque | 895 | 205 | 385 | 1200 |
| Compact. Temp | 167 | 186 | 181 | 159 |
| Fusion Time | 60 | 198 | 132 | 50 |
| Fusion Torque | 2335 | 2490 | 2615 | 2915 |
| Fusion Temp. | 193 | 194 | 192 | 184 |
| Fusion Energy |  |  |  |  |
| from Injection | 592 | 824 | 826 | 594 |
| from Compaction | 479 | 657 | 605 | 437 |
| Equilibrium Torque | 1985 | 2145 | 2145 | 2185 |
| Equilibrium Torque | 201 | 200 | 200 | 200 |

Note: Time in Seconds, Torque in Meter-grams, Temperature in Degrees, C., Energy in Kmg. Brabender Conditions: 190 C, 60 RPM, 42 CC Charge.

BRABENDER EXTRUSION Drop Dart Impact

| Evaluation 1 | 3.54(0.37) | 1.28(0.15) |  |  |
| Evaluation 2 | 3.43(0.06) |  | 1.24(0.04) | 1.53(0.07) |

Note: Reported as MFE (standard deviation) in inch-pounds/mil, per ASTM D4226, Procedure A. Brabender Conditions: 170/180/190/190 C, 40 RPM

We claim:

1. A process for the fusion into an intimate blend of a composition comprising
    (A) 100 parts of a polymer of vinyl chloride;
    (B) from 0.5 to 10 parts of at least one stabilizer against thermal decomposition of the homopolymer of vinyl chloride:
    (C) from 1 to 25 parts of a core/shell polymer comprising:
        (i) from 60 to 90 parts, based on 100 parts of the core/shell polymer, of a core of a copolymer of butyl acrylate of the composition, based on 100 parts of the core, of
            a) 60 to 99.9 parts of polymerized units of n-butyl acrylate;
            b) from 0 to 39.9 parts of polymerized units of an alkyl acrylate other than n-butyl acrylate, the alkyl group containing 2 to 8 carbon atoms;
            c) from 0.1 to 2.5 parts of polymerized units of at least one non-conjugated polyunsaturated monomer;
        (ii) correspondingly, from 10 to 40 parts, based on 100 parts of the core/shell polymer, of a shell of copolymer of the composition, based on 100 parts of the shell, of
            a) from 50 to 90 parts of polymerized units of methyl methacrylate;
            b) from 10 to 50 parts of polymerized units of at least one monoethylenically unsaturated alkyl acrylate, the alkyl group containing 2 to 8 carbon atoms;
    wherein the fusion is characterized by
        1) a pre-fusion torque value at least 15% higher than that for a control composition equivalent in all respects except that the composition of the shell is at least 95 parts of polymerized units of methyl methacrylate, based on 100 parts of the shell;
        2) a time to fusion torque no longer than for the control composition;
        3) maintenance of color at least equivalent to that of the control composition,
    the process comprising
    (D) combining the polymer of vinyl chloride, the stabilizer, and the core/shell polymer into a non-compacted blend;
    (E) heating and admixing with shear the non-compacted blend to convert it to a fused, intimate, cohesive but non-homogenous melt;
    (F) melt-processing and then cooling the melt to form a useful object in the form of an extruded object, an injection-molded object, a calendered sheet or film, a compression-molded object, an extruded chopped strand, or re-processable pellets.

2. A process for the fusion into an intimate blend of a composition comprising
    (A) 100 parts of a polymer of vinyl chloride;
    (B) from 0.5 to 10 parts of at least one stabilizer against thermal decomposition of the homopolymer of vinyl chloride:
    (C) from 1 to 25 parts of a core/shell polymer comprising:
        (i) from 60 to 90 parts, based on 100 parts of the core/shell polymer, of a core of a copolymer of butyl acrylate of the composition, based on 100 parts of the core, of
            a) 60 to 99.9 parts of polymerized units of n-butyl acrylate;
            b) from 0 to 39.9 parts of polymerized units of an alkyl acrylate other than n-butyl acrylate, the alkyl group containing 2 to 8 carbon atoms;
            c) from 0.1 to 2.5 parts of polymerized units of at least one non-conjugated polyunsaturated monomer;
        (ii) correspondingly, from 10 to 40 parts, based on 100 parts of the core/shell polymer, of a shell of copolymer of the composition, based on 100 parts of the shell, of
            a) from 50 to 85 parts of polymerized units of methyl methacrylate;
            b) from 20 to 50 parts of polymerized units of at least one monoethylenically unsaturated alkyl methacrylate, the alkyl group containing 4 to 12 carbon atoms;

wherein the fusion is characterized by 1) pre-fusion torque value at least 15% higher than that for a control composition equivalent in all respects except that the composition of the shell is at least 95 parts of polymerized units of methyl methacrylate, based on 100 parts of the shell;
2) time to fusion torque no longer than for the control composition;
3) maintenance of color at least equivalent to that of the control composition, the process comprising (D) combining the polymer of vinyl chloride, the stabilizer, and the core/shell polymer into a non-compacted blend;
(E) heating and mixing with shear the non-compacted blend to convert it to a fused, intimate, cohesive but non-homogenous melt;
(F) melt-processing and then cooling the melt to form a useful object in the form of an extruded object, an injection-molded object, a calendered sheet or film, a compression-molded object, an extruded chopped strand, or re-processable pellets.

3. The process of claims 1 or 2 wherein the at least one non-conjugated polyunsaturated monomer is selected from the group consisting of allyl methacrylate, allyl acrylate, diallyl fumarate, diallyl maleate, diallyl itaconate, and glycol or polyol esters of acrylic or methacrylic acid.

4. The process of claims 1 or 2 where the at least one stabilizer is present at from 1 to 4 parts, and the stabilizer is an organotin ester or a calcium salt of a long chain organic acid.

5. The process of claims 1 or 2 wherein the core comprises from 97.5 to 99.9 parts of n-butyl acrylate, and wherein the alkyl group of the shell composition is n-butyl.

6. A melt-blended composition comprising:

(A) 100 parts of a polymer of vinyl chloride;
(B) from 0.5 to 10 parts of at least one stabilizer against thermal decomposition of the homopolymer of vinyl chloride:
(C) from 1 to 25 parts of a core/shell polymer comprising:
  (i) from 60 to 90 parts, based on 100 parts of the core/shell polymer, of a core of a copolymer of butyl acrylate of the composition, based on 100 parts of the core, of
    a) 60 to 99.9 parts of polymerized units of n-butyl acrylate;
    b) from 0 to 39.9 parts of polymerized units of an alkyl acrylate other than n-butyl acrylate, the alkyl group containing 2 to 8 carbon atoms;
    c) from 0.1 to 2.5 parts of polymerized units of at least one non-conjugated polyunsaturated monomer;
  (ii) correspondingly, from 10 to 40 parts, based on 100 parts of the core/shell polymer, of a shell of copolymer of the composition, based on 100 parts of the shell, of
    a) from 50 to 90 parts of polymerized units of methyl methacrylate;
    b) from 10 to 50 parts of polymerized units of at least one monoethylenically unsaturated alkyl acrylate, the alkyl group containing 2 to 8 carbon atoms;

wherein the composition is characterized during melt-blending by 1) a pre-fusion torque value at least 15% higher than that for a control composition equivalent in all respects except that the composition of the shell is at least 95 parts of polymerized units of methyl methacrylate, based on 100 parts of the shell;
2) a time to fusion torque no longer than for the control composition;
3) maintenance of color at least equivalent to that of the control composition.

7. A melt-blended composition comprising (A) 100 parts of a polymer of vinyl chloride;
(B) from 0.5 to 10 parts of at least one stabilizer against thermal decomposition of the homopolymer of vinyl chloride:
(C) from 1 to 25 parts of a core/shell polymer comprising:
  (i) from 60 to 90 parts, based on 100 parts of the core/shell polymer, of a core of a copolymer of butyl acrylate of the composition, based on 100 parts of the core, of
    a) 60 to 99.9 parts of polymerized units of n-butyl acrylate;
    b) from 0 to 39.9 parts of polymerized units of an alkyl acrylate other than n-butyl acrylate, the alkyl group containing 2 to 8 carbon atoms;
    c) from 0.1 to 2.5 parts of polymerized units of at least one non-conjugated polyunsaturated monomer;
  (ii) correspondingly, from 10 to 40 parts, based on 100 parts of the core/shell polymer, of a shell of copolymer of the composition, based on 100 parts of the shell, of
    a) from 50 to 85 parts of polymerized units of methyl methacrylate;
    b) from 20 to 50 parts of polymerized units of at least one monoethylenically unsaturated alkyl methacrylate, the alkyl group containing 4 to 12 carbon atoms;

wherein the composition is characterized during melt-blending by 1) a pre-fusion torque value at least 15% higher than that for a control composition equivalent in all respects except that the composition of the shell is at least 95 parts of polymerized units of methyl methacrylate, based on 100 parts of the shell;
2) a time to fusion torque no longer than for the control composition;
3) maintenance of color at least equivalent to that of the control composition.

8. The process of claim 1 or 2 where the blend composition further comprises from 0.1 to 30 parts of filler.

9. The composition of claim 6 or 7 where the blend composition further comprises from 0.1 to 30 parts of filler.

10. An article manufactured from the composition of claim 6 or 7.

* * * * *